June 21, 1927.

J. WAHL ET AL

GAUGE

Original Filed July 5, 1924

1,633.145

INVENTORS:
John Wahl and
Otto Melzer,
By Attorneys,
Fraser, Myers & Manley.

Patented June 21, 1927.

1,633,145

UNITED STATES PATENT OFFICE.

JOHN WAHL, OF ROSEDALE, AND OTTO MELZER, OF HOLLIS, NEW YORK, ASSIGNORS TO A. SCHRADER'S SON, INC., OF BROOKLYN, NEW YORK, A CORPORATION OF NEW YORK.

GAUGE.

Original application filed July 5, 1924, Serial No. 724,359. Divided and this application filed May 29, 1926. Serial No. 112,489.

This invention relates to pressure gauges and aims to provide certain improvements therein.

The invention is particularly directed to pressure gauges of the telescoping indicating sleeve type, wherein the indicator sleeve which has calibrated pressure markings thereon is moved outwardly into indicating position by a plunger attached to the outer end of a loading spring, the inner end of which is connected with the casing. The plunger is normally in contact with the top of an extensible sleeve which is moved outwardly by fluid pressure upon its admission to the gauge, and the loading spring is so proportioned with relation to the extensible sleeve that it expands substantially uniformly therewith. In testing gauges of this type after assembling, it is frequently found that the indicating member is projected outwardly, either a greater or lesser distance than the calibrated scale markings warrant for a given pressure, and to remedy this, a different extensible sleeve must be substituted for the one in the gauge. This necessitates the removal of the gauge foot portion and other elements, all of which consumes considerable time.

According to the present invention, we provide means whereby the gauge after assembling may be adjusted from the exterior thereof without the substitution of parts. We accomplish this through the medium of adjusting means, which are preferably screw-threaded, whereby the normal relative positions of the plunger and the top of the indicating sleeve may be varied and then locked in the adjusted position. The invention also includes other features of improvement which will be hereinafter more fully described.

Referring to the drawings wherein we have shown certain preferred embodiments of our invention,—

Figure 1:
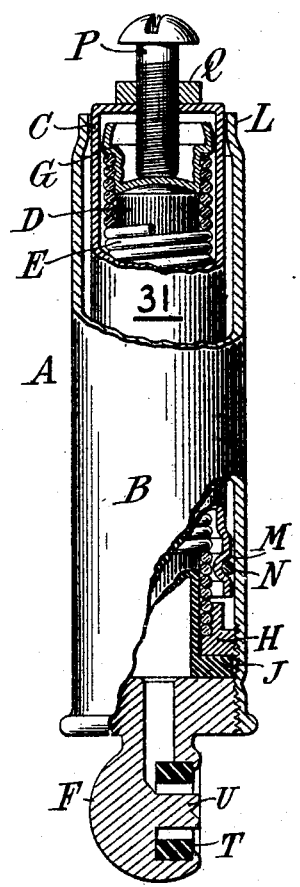
Figs. 1 and 2 show views partly in elevation and partly in longitudinal section of two embodiments of the invention.
Figure 2:
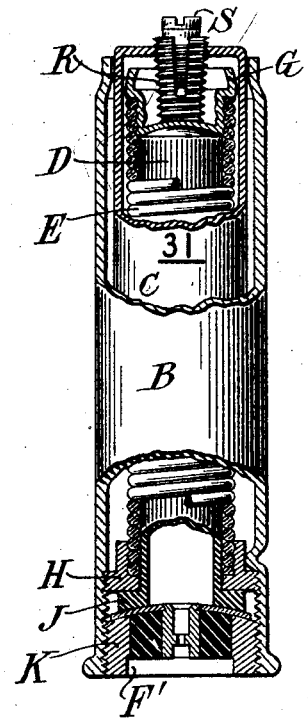
Figure 3:
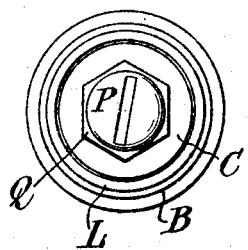
Figs. 3 and 4 are top plan views of Figs. 1 and 2 respectively.
Figure 4:
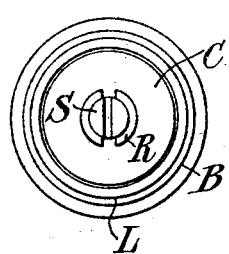

Referring to the drawings, let A indicate a tire pressure gauge as a whole which comprises a cylindrical casing B, a telescoping indicating sleeve C, an elastic thimble D, a loading spring E surrounding the thimble, and a foot portion F, as shown in Fig. 1, and F', as shown in Fig. 2. Normally seating against, but disconnected from the outer end of the thimble D is a cup-shaped plunger G preferably formed of sheet metal, a portion thereof being externally threaded to receive the convolutions of the outer end of the loading spring E, the inner end of said spring being received and held by an internally-threaded sleeve H which serves to anchor the spring to the casing. The bottom face of the sleeve H seats upon a lateral flange J formed on the elastic thimble, and which is compressed between the sleeve H and a plug K of the foot portion to provide a leak-tight seal between said parts. The outer end of the casing B is turned or spun inwardly as shown at L to provide a guide and limiting stop shoulder for the telescoping sleeve C which has its lower end formed with a groove M in which seats a split spring ring N adapted to frictionally engage the inner wall of the casing B to hold the indicating sleeve in indicating position after the thimble D, loading spring E, and plunger G have returned to normal position, after moving the indicating sleeve outwardly. The parts thus far described are those common to the standard tire pressure gauge of the telescoping sleeve type now in general use.

In this type of gauge the indicating sleeve is provided with a carefully calibrated scale, and the plunger which moves the indicating sleeve outwardly is normally in contact with the top of the elastic sleeve, which is moved outwardly by fluid pressure upon its admission to the gauge, and the loading spring is so proportioned with relation to the extensible elastic sleeve that it expands substantially uniformly therewith, hence proper registering of pressure is dependent upon the normal relative positions of the plunger and the top of the indicating sleeve. In testing gauges of this type after assembling it is frequently found that the indicating member is projected outwardly either a greater or lesser distance than the calibrated scale markings warrant for a given test pressure, due mainly to slight differences in the lengths of the elastic thimbles and also in the effective lengths of the loading springs, which factors give rise to slight variations in the relative normal positions of the plunger with respect to the top of the indicating sleeve. To remedy this condition a different extensible sleeve is usually substituted for the one in the gauge, which of course necessitates the disassembling of the interior mechanism of the gauge or "gauge insides".

According to the present invention these slight differences may be compensated for after the gauge parts have been assembled, by adjusting means operable from the exterior of the gauge. The adjusting means are adapted to vary the normal relative positions of the plunger and top of the indicating sleeve, such initial adjustment not affecting the subsequent extension of the loading spring.

In Fig. 1 the adjustment between the plunger G and the top of the telescoping sleeve C is controlled by a screw P passing through the top of the telescoping sleeve and adapted to engage the bottom of the plunger to move the sleeve outwardly. The adjustment after once made may be locked against accidental shifting by a lock nut Q on the screw P.

In Fig. 2 the adjusting means is in the form of a split screw-threaded sleeve R passing through the top of the indicating member and a wedging screw S entering the top of the split sleeve and adapted to lock it through a wedging action in any adjusted position.

The gauges to which the present invention is applicable may be of various forms, for example, in Fig. 1 the foot portion F is formed with a press-on seat T and a tire valve depressor U arranged at right angles to the longitudinal axis of the gauge, and thereby adapt the gauge for ready application to tire valves on spring wheels and heavy truck wheels. In Fig. 2 we have shown the invention applied to a gauge provided with a standard foot portion having a press-on seat T' and a tire valve depressor U'.

Having thus described the invention, let it be assumed that the gauge is assembled and that it is subjected to a test pressure of fifteen pounds, and it is found that the indicating sleeve is moved outwardly to a point indicating fourteen pounds. This indicates that the indicating sleeve must be raised with respect to the plunger a distance corresponding to that between the indications 14 and 15. This is accomplished by threading the screw P or sleeve R inwardly, respectively, a slight distance and locking said elements in their new position against accidental displacement. If, on the other hand, upon applying a pressure of fifteen pounds to the gauge, the indicating sleeve is moved to a point corresponding to sixteen pounds, then adjustment is made as in the preceding manner, but in the reverse direction.

While we have shown and described certain embodiments of our invention, it will be understood that certain changes may be made therein without departing from the spirit thereof.

What we claim is:

1. A pressure gauge comprising a pair of telescoping members, one of which has means at its bottom for engagement with a tire valve or the like and pressure-responsive means within said member for moving the second member outwardly with respect to the top of the first, the exterior of one of said members having a calibrated scale thereon adapted to co-operate with one edge of the other member to indicate pressure, and adjustable means extending through the top of the second telescoping member and operable from the exterior of said member after the gauge parts have been assembled for adjusting the normal position of the top of the movable member with respect to the top of the pressure-responsive means to insure proper registering of pressures.

2. A tire pressure gauge comprising an elongated casing, an indicating member telescoping with the top of said casing, anchoring means and a plunger within said casing near the bottom and top thereof respectively, pressure-responsive means within said casing comprising a loading spring, the bottom end of which is anchored to the casing through said anchoring means, and the top end connected to the plunger which is adapted to move the indicating member outwardly, and adjustable means extending through the top of the indicating member for adjusting the normal position of the top of the indicating member with respect to the plunger to insure proper registering of pressure.

3. A tire pressure gauge comprising an elongated casing, an indicating member telescoping with the top of said casing, anchoring means and a plunger within said casing near the bottom and top thereof respectively, pressure-responsive means within said casing comprising a loading spring, the bottom end of which is anchored to the casing through said anchoring means, and the top end connected to the plunger which is adapted to move the indicating member outwardly, screw-threaded means extending through the top of the indicating member for adjusting the normal position of the top of the indicating member with respect to the plunger to insure proper registering of pressure, and means for locking said screw-threaded means against accidental displacement.

In witness whereof, we have hereunto signed our names.

JOHN WAHL.
OTTO MELZER.